United States Patent [19]

Hawkes et al.

[11] Patent Number: 5,905,949
[45] Date of Patent: *May 18, 1999

[54] CELLULAR TELEPHONE FRAUD PREVENTION SYSTEM USING RF SIGNATURE ANALYSIS

[75] Inventors: Kelly Davidson Hawkes, Los Altos; Michael Shaw McKinley; Kenneth Irwin Talbot, both of Sunnyvale, all of Calif.

[73] Assignee: Corsair Communications, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/576,116

[22] Filed: Dec. 21, 1995

[51] Int. Cl.⁶ .............................. H04M 11/00; H04K 1/00
[52] U.S. Cl. .......................... 455/410; 455/67.1; 380/23
[58] Field of Search ................................. 379/59, 60, 57; 342/13; 455/33.1, 410, 411, 423, 67.1; 380/23

[56] References Cited

U.S. PATENT DOCUMENTS

| | | | |
|---|---|---|---|
| 4,837,575 | 6/1989 | Conner, Jr. | 342/45 |
| 5,005,210 | 4/1991 | Ferrell | 455/115 |
| 5,266,961 | 11/1993 | Milroy | 343/772 |
| 5,305,007 | 4/1994 | Orr et al. | 342/20 |
| 5,329,591 | 7/1994 | Magrill | |
| 5,345,595 | 9/1994 | Johnson et al. | 379/60 X |
| 5,400,031 | 3/1995 | Fitts | 342/36 |
| 5,420,910 | 5/1995 | Rudokas et al. | 379/59 |
| 5,448,760 | 9/1995 | Frederick | 455/410 |
| 5,469,165 | 11/1995 | Milroy | 342/13 |
| 5,608,410 | 3/1997 | Stilp et al. | 342/387 |
| 5,627,886 | 5/1997 | Bowman | 379/145 X |
| 5,706,333 | 1/1998 | Grenning et al. | 455/423 |
| 5,715,174 | 2/1998 | Cotichini et al. | 395/200.59 |

Primary Examiner—David R. Hudspeth
Assistant Examiner—Scott Richardson
Attorney, Agent, or Firm—David E. Lovejoy

[57] ABSTRACT

Apparatus for identifying wireless subscriber units and for determining if access to a communications network should be granted. A plurality of wireless subscriber units each generates a wireless subscriber signal including internal data traits and external signal traits. The internal data traits include an identification code. A RF downconverter is located remote from the wireless subscriber units and receives the wireless subscriber signal. A characterizing device is connected to the RF downconverter and extracts parameters that characterize the external signal traits of the wireless subscriber units. A decision device computes the likelihood that the observed parameters belong to the validated wireless subscriber unit to determine if access to the wireless subscriber service should be granted. The apparatus may be used to prevent cellular telephone cloning fraud.

15 Claims, 6 Drawing Sheets

CELLULAR TELEPHONE FRAUD PREVENTION SYSTEM USING RF SIGNATURE ANALYSIS

BACKGROUND OF THE INVENTION

This invention relates to wireless subscriber systems and, more particularly, the use of devices for granting or denying access to wireless subscriber systems to prevent cellular telephone cloning fraud.

Fraudulent or other unauthorized users reprogram clone phones with the MIN (mobile identification number) and ESN (electronic serial number) from authorized phones of subscribers. This cloning permits the unauthorized users to place cellular phone calls without paying for them. A technique is needed to distinguish between cloned phones and authorized phones so that steps can then be taken to prevent the cloned phones from having access to the cellular phone system.

In the Magril (U.S. Pat. No. 5,329,591), Ferrell patent (U.S. Pat. No. 5,005,210), and Fredrick patent (U.S. Pat. No. 5,448,760) patents, systems are provided for preventing access by unauthorized users. Neither the Magrill, Ferrell, nor Fredrick patents takes into account the RF propagation effects that distort the transmitted waveform from the wireless subscriber unit. Transmitters that are a long distance away from the identification system will have a low signal-to-noise ratio. In cellular telephone applications, frequencies are reused which increase the probability of co-channel interference from a nearby cell. Some wireless subscriber units attempt to access the wireless subscriber system at the same time as other units thereby causing co-channel interference.

A fraudulent user may attempt to gain access to a wireless network several consecutive times within a short period of time. Such repeated attempts may be detected or may result in the fraudulent user gaining access to the system. Prior systems do not use the results of previous decisions on access to aid in the current decision as to whether or not the current attempt is legitimate.

Prior systems do not provide a technique of fraud detection using the outputs of diversity and sectorized antennas typical of cellular base stations.

Although the Ferrell system extracted a few transient parameters to characterize transmitters and may have worked in the environment that consisted of a few ham radio transmitters, a need exists for the ability to distinguish between thousands of legitimate cellular phones and unauthorized phones.

Accordingly, there is a need for improved fraud prevention systems having parameters that are effective in distinguishing between authorized cellular phones and unauthorized clones.

SUMMARY OF THE INVENTION

The present invention is a transmitter identification system for detecting unauthorized transmitters that may have been cloned for fraudulent use. The transmitter identification system includes a plurality of transmitters where each transmitter broadcastes a transmitter signal having an identification code unique to the transmitter. A receiver receives the broadcast transmitter signal and provides a corresponding received signal. A demodulaor is provided for demodulating the received signal to recover the identification code corresponding to the transmitter. An extractor is provided for extracting parameters from the received signal. The extractor includes a processor or routines for processing a plurality of signal characteristics to form the parameters that are effective for detecting fraud. Means are provided for determining the likelihood that said parameters are typical for said transmitter having the recovered identification code.

The present invention is a system that determines whether or not a cellular phone call is from a legitimate user or from an unauthorized user. The parameters that are used are resilient to RF propagation effects. Also, the invention uses the results of recent previous intercepts to improve the decision concerning the current intercept. In addition to transient parameters, the invention extracts several non-transient parameters and is able to distinguish between a greater numberof wireless subscribers.

The present invention has the advantage of being robust to the RF propagation perturbations imposed on the signal while it is being transmitted from the cellular phone to the base station. If the cellular phone is far away from the base station, the received signal level will be small and the resultant signal to noise ratio will be small. Several steps are taken to ensure that the measurements taken on the signal transmitted by the cellular phone are not corrupted by the noise introduced by the base station. Due to reflections, the signal may take multiple paths as it propagates from the cellular phone to the base station antenna. The path length differences causes the rays from each path to add constructively or destructively. When they cancel each other out, a multi-path null in the signal's amplitude occurs. Since cellular phones are mobile, the path lengths change and the multi-path nulls come and go during the transmission. Several steps are taken to ensure that the fading during a multi-path null does not corrupt the measurements taken on the signal. Cellular phones reuse frequency channels from distant base stations. However, in areas with small cells, a signal from a cellular phone in a distant cell may propagate to the local cell in which the present invention is deployed. This co-channel interference may distort a transmission from a cellular phone in the local cell. This invention includes techniques to detect co-channel interference and take appropriate actions so that legitimate users are not denied access to the cellular phone network.

After several characteristic measurements or parameters are taken on the signal transmitted by the cellular phone, this invention measures the likelihood that the signal came from the claimed user. The claimed user is contained in an identification code field that is transmitted by the cellular phone. The identification code consists of the MIN and/or ESN. The likelihood is a distance measure from the center of the stored parameters' cluster to the observed parameters.

The foregoing and other objects, features and advantages of the invention will be apparent from the following detailed description in conjunction with the drawings.

DESCRIPTION

1. Overview

A cellular phone transmits one of several messages to the base station. These messages are transmitted on predetermined reverse control channel (RECC) frequencies. An antenna 21 collects the transmissions from cellular phones. The RF front end subsystem 1 down converts in converter 4 a selected portion of the RF spectrum containing the signal transmitted by the cellular phone thereby producing an intermediate frequency (IF) signal which in turn is digitized by an analog to digital (A/D) converter 5.

The samples from the A/D converter 5 are passed to a digital signal processor (DSP) 2. The DSP may consist of one or more computers based upon the sample rate of the A/D converter 5 and the complexity of the signal processing. The DSP converts in unit 6 the samples into a complex (in-phase and quadrature) on line signal 8 and reduces the sample rate. Software routines in the DSP include the extract parameters 7 for extracting parameters from the intercept that appear on line 8. These parameters are measurements that characterize the transmission. Parameters permit subsequent processing to distinguish between authorized and unauthorized cellular phones. The information in the message from the cellular phone is recovered by a bit decoder 11. The bit decoder 11 in FIG. 1 operates on the IF signal on line 8. Another embodiment includes a bit decoder operating on the output of an FM receiver (not shown). Included in the RECC transmission is the mobile identification number (MIN) and the electronic serial number (ESN) which are used by the cellular base station to grant or deny access to the cellular telephone network. These numbers are extracted by the bit decoder 11. The DSP 2 operates in real time to process the samples from the A/D converter 5 and generate the parameters, and recovered text.

Figure 1:
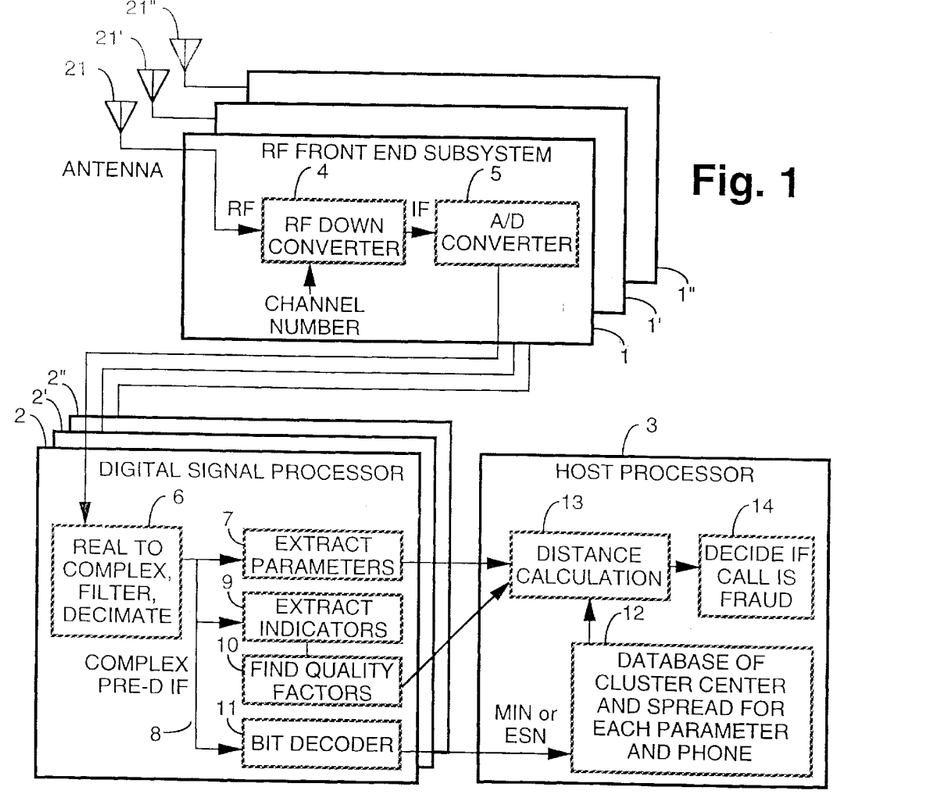
FIG. 1 is a block diagram of the equipment used to receive, detect, and characterize the transmissions from a mobile wireless subscriber.

The host processor 3 compares the parameters extracted by DSP 2 with a stored database of authorized cellular phone numbers (MIN and ESN). The MIN and/or the ESN numbers are used as an index into a database 12. Coming from the database are the parameter statistics. A distance between the observed parameters and the stored parameters is computed by the distance calculation 13. If the distance is small (high likelihood of match), then no action is taken and the cellular base station grants access to the cellular phone. If the distance is large 14, then appropriate actions are taken to prevent the cellular phone from gaining access.

2. Alternative Configurations

FIG. 1 shows the equipment deployed for a single sector of a base station. Another embodiment operates in cells that have multiple receive antennas 21, 21', and 21", each pointing in a different direction or sector. Cells typically have three such sector antennas 21, 21', 21. Separate RF front end subsystems 1' and 1", like subsystem 19, process each antenna. The outputs of the RF front end subsystems 1, 1', and 1" are combined in DSP2. For low amplitude signals, each RF front end subsystem output is adjusted in amplitude and phase so that when the outputs are added together, the result has the largest possible SNR. The signals add coherently but the noise adds incoherently. This combining is called maximal ratio combining. High amplitude signals are treated differently. The sector with the highest amplitude signal that is not saturating the electronics of its RF front end subsystem is selected. This operation extends the dynamic range of the RF front end subsystem.

Another embodiment operates in cells that use two spatially diverse antennas. In this embodiment, for a 100-foot tower, the spatially diverse antennas (for example, 21 and 21') are typically 9 feet apart. The RF front end subsystem is replicated (for example, subsystems 1 and 1') and connected to each diversity antenna. An RF front end 1 and 1' is connected to each spatially diverse antenna 21 and 21'. Maximal ratio combining of the outputs of the RF front ends is then performed in the DSP2 to synthesize a single signal.

Another embodiment operates in cells with multiple receive antennas 21, 21', AND 21", whether they be diverse or sectorized. An RF front end subsystem 1, 1', and 1", operate with each antenna. A digital signal processor (for example, 2, 2', and 2") extracts parameters and decodes the bits on the output of each RF front end subsystem, provided that the signal is detected. Each digital signal processor forwards its information to a common host processor 3. The host processor selects the parameters from the signal with the highest quality (high SNR without saturation) and discards the rest.

Signal detection is the process of determining when and if a RF downconverter 4 is processing a signal from the transmitter to be identified. A detected signal is one that satisfies prescribed criteria. This criteria may be one or more of the following: an amplitude above a prescribed threshold, reception of the synchronization data bits with a bit error rate below a given threshold, reception of the digital color code bits with a bit error rate below a given threshold, signal to co-channel interference power ratio greater than a prescribed threshold, and signal-to-noise power ratio greater than a prescribed threshold. Subsequent processing (such as characterizing the output of the RF downconverter) proceeds only if the signal is detected.

Figure 9:
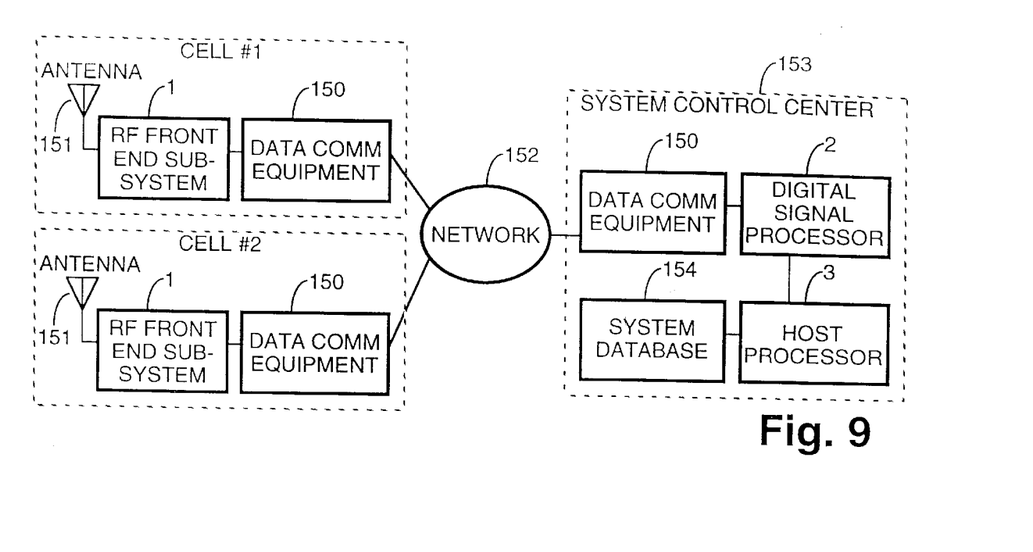
FIG. 9 shows one technique of applying this invention in multiple cells. The network connects the RF front end subsystem with the digital signal processor.
Figure 10:
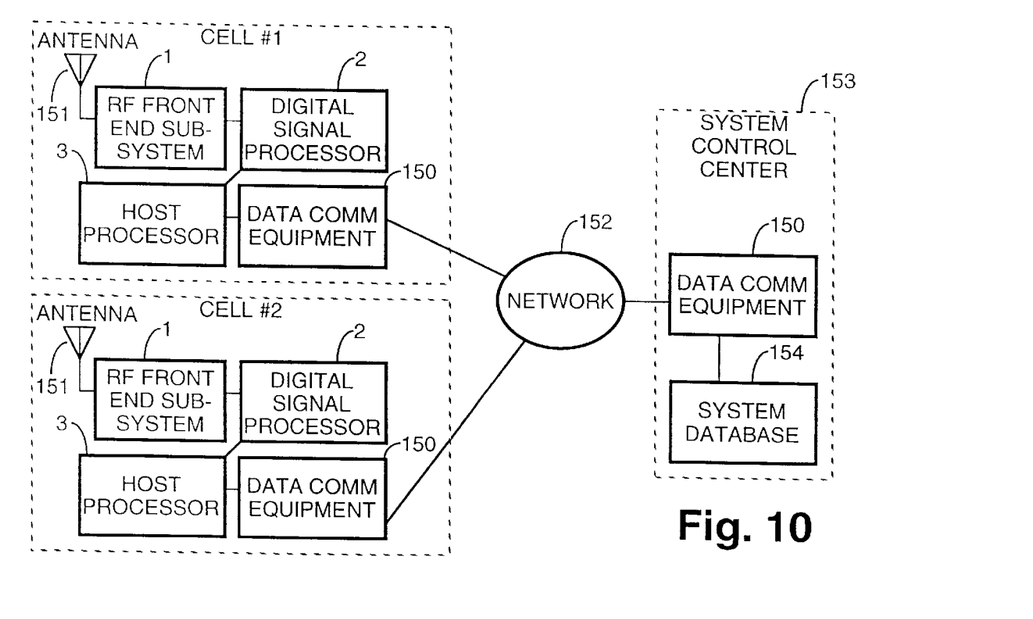
FIG. 10 shows one technique of applying this invention in multiple cells. The network connects the host processor to the system database.

For FIGS. 9 and 10, the RF front end subsystem 1 of cell #1 is tuned to the channel number that the cellular telephone would use if it were operating in the cell #1. The channel number may be different between cell #1 and cell #2. When the mobile phone is in cell #1 it is processed by the equipment in cell #1 and vice-versa. Typically, only one antenna-RF front end subsystem pair detects the cellular telephone signal based on cellular telephone channel number, RF down converter channel number, and the distance between the cellular telephone and the receive antennas. Thus, the digital signal processor only extracts parameters if the transmitted signal is detected.

Typically there are several cells that communicate with a mobile telephone switching office. FIG. 9 shows one technique of using this invention in a cellular telephone system where there are several cells. Only two of the many cells are shown. Cells are typically 2 miles apart and at least 200 feet apart. Each cell has separate receiving equipment consisting of at least one antenna 151 and an RF front end subsystem 1. The data communication network 152 provides for transportation of information between the RF front end subsystem 1 and the digital signal processor 2 by using the data communication equipment 150. The digital signal processor 2 at the system control center 153 is remote from the various cells.

A different embodiment places the antenna, RF front end subsystem, and digital signal processor at the cell sites and uses the data communication network to transmit parameters and the identification number to a host processor at the system control center.

FIG. 10 shows yet another embodiment of the invention in a cellular telephone system where there are several cells. In this embodiment, the digital signal processor 2, and the host processor 3 are remoted at the cell sites and are connected to the system database 154 via the network 152.

The system database 154 provides control over the equipment in various cells. It receives status and performance reports. It receives information that characterizes the cellular telephones from the various cells. It compiles and updates the composite information collected across the various cells and returns phone characterization (parameter statistics) to the individual cells. Thus, a legitimate cellular telephone could be characterized in cell #1 and this characterization be used to identify the cellular telephone as legitimate when it travels to and is used in cell #2.

The RF down converter 4 is designed so that one copy the down converter at one cell colors a RECC transmission in the same way that a second copy of the down converter would at another cell. This requires the frequency accuracy and IF filter characteristics to be tightly controlled from one copy to another. An alternative is to have filter coefficients 6 tailored for each RF down converter 4 so that their net response 8 produces a consistent set of parameters that don't vary from one RF down converter to another.

3. Modulation Parameters

Figure 2:
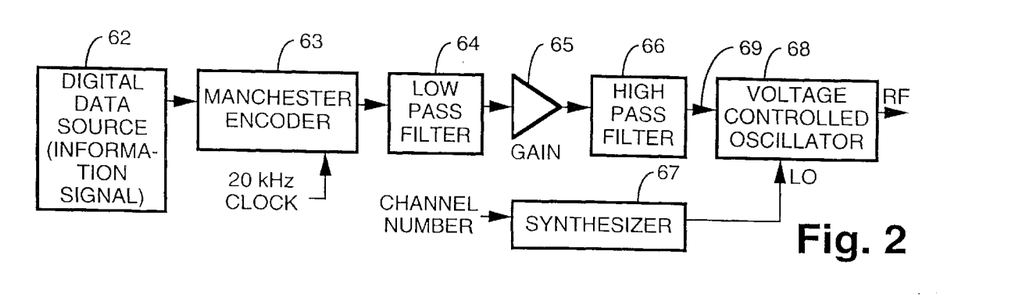
FIG. 2 is a block diagram of a typical cellular phone for the modulator that generates the FSK signal.

FIG. 2 shows some of the signal processing blocks, typical of cellular phone handsets, used to generate the frequency-shift keyed (FSK) reverse control channel signal. The discrete components that comprise the high pass filter, low pass filter, and amplifier vary from one cellular phone to another and techniques are described to measure the characteristics of these blocks. These modulation characteristics are dependent on the discrete components that vary from phone to phone. It is this variation that enables the distinguishing of authorized phones from unauthorized phones.

Modulation characteristics of the modulator within a transmitter, consist of one or more of the following items: rise time of its low pass filter function, overshoot of its low pass filter function, natural frequency of its low pass filter function, damping factor of its low pass filter function, rise time of its high pass filter function, overshoot of its high pass filter function, natural frequency of its high pass filter function, and damping factor of its high pass filter function. Modulation characteristics also include linear combinations or transforms of the items in this list.

Figure 3:
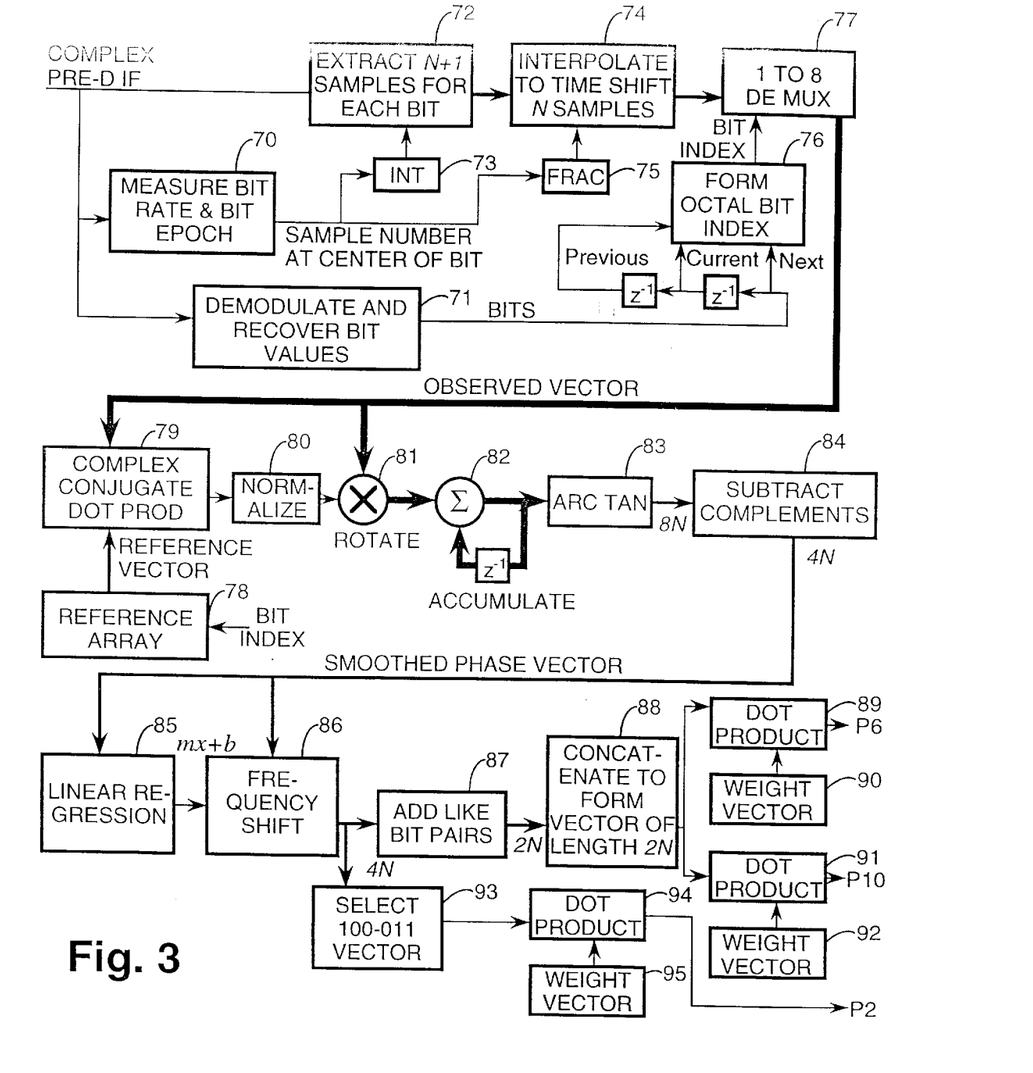
FIG. 3 is a signal processing diagram for measuring the modulation characteristics of a cellular phone.

FIG. 3 shows the signal processing steps to extract parameters of modulation characteristics. The bit rate and the bit epoch are measured 70. From these, the sample number of the center of every bit is computed to produce a time comb. A time comb is a list containing the time when each bit or bit transition occurs. The integer part 73 of the time comb is used 3to extract 72 the center N+1 samples from every bit, where N is the number of samples per bit. The fractional part 75 of the time comb is used to interpolate 74 the N+1 samples so that they are time shifted so that the Kth element is aligned with the center of the bit. Interpolation is necessary since the sample rate may not be a multiple of the bit rate, and it is desired to align the center of the bit with the Kth element of the N+1 samples.

A demodulator 71 operates on the complex pre-d IF samples 8 and recovers the bit sequence sent in the RECC message. An octal number is formed 76 by the previous, current, and next bits. This 3-bit index is used to separate 77 the input vectors into eight categories. Because of the filtering in the cellular phone, there is considerable intersymbol interference. The interference on the current bit is affected by the previous and next bit. Hence, it is necessary to consider bit sequences rather than individual bits.

The bit index is used to address 78 an array of typical vectors. There is a typical vector for each of the 8 bit index combinations. A complex conjugate dot product 79 is computed between the reference and observed vectors. Only the portion of the observed vector corresponding to the center of the bit is used to measure this correlation, since the edges of the bit will suffer from a higher amount of intersymbol interference. The correlation is normalized 80 so that it has unit amplitude. The observed vector is multiplied 81 by the correlation. This rotates the observed vector in phase so that it aligns with the reference vector. This step removes the unknown phase of the received signal and causes each observed vector for a given bit index to have the same phase, so that when they are accumulated 82, they add coherently. If the signal is weak for a particular bit, the contribution of the observed vector to the accumulated vector will be small. This emphasis means that those portions of the RECC intercept that are weak due to multipath fading do not significantly affect the result, while those portions that are stronger contribute more heavily to the sum. This accumulation process operates on the lines of the message from which bits can be extracted. This "synchronous integration" substantially improves the SNR when compared with using samples spanning just one bit. As a result of this accumulation, there are eight complex vectors, each N samples long.

Synchronous integration is the process of adding together different parts of a waveform. Portions of the waveform are selected which have similar underlying modulation characteristics. The various portions are shifted in time, frequency, phase, and/or amplitude before accumulation. Synchronous integration mitigates the effects of noise, interference, and multi-path fading, since the signal adds coherently but the deleterious effects do not.

An arc tangent 83 function operates on the accumulated complex vectors to compute the phase. By selecting the reference vector's average phase to be zero, none of the phase values will occur at the arc tangent discontinuity at $\pm\pi$.

There are 8-bit indexes represented as 000, 001, 010, 011, 100, 101, 110, and 111. The complements of 000, 001, 010, and 011 are 111, 110, 101, and 100 respectively. Four pairs of phase vectors are subtracted 84 from each other, as referenced by a bit index and its complement. The phase vector corresponding to bit index 110 is subtracted from the phase vector referenced by bit index 001 to form the smoothed phase vector 001. This operation reduces the number of vectors from eight down to four smoothed phase vectors.

When the RF downconverter's center tuned frequency is different from the signal's frequency, the elements of the smoothed phase vector will progress arithmetically from one element to the next. To remove this frequency offset, linear regression 85 is applied to the elements of each smoothed phase vector corresponding to the center portion of each bit. The average value of this linear regression slope can be used to compute the frequency offset. To make the resultant parameters insensitive to signal center frequency offset, each smoothed phase vector is shifted in frequency 86 by subtracting a ramp vector with a slope corresponding to the estimated frequency offset. Since some RECC transmissions not only have frequency offset but also frequency chirp, a different ramp slope is used for each bit index.

The first half of smoothed phase vectors 010 and 011 are similar because they have the same previous bit (0) and the same current bit (1) and vary only by the next bit. The amount of information is now reduced by two by adding 87 portions of smoothed phase vectors that come from the same bit values. The result is placed 88 in a result vector of length 2N.

The result vector has elements with characteristic values that uniquely identify each phone. To reduce the number of parameters from 2N down to 2, a dot product 89 is computed between the result vector and a weight vector 90. In this particular application, this dot product is repeated with a different weight vector to produce a total of two different parameters, parameters 6 and 10; other numbers of dot products are readily apparent. There are many different weight vectors which could be used. The elements of the weight vectors could be selected so that the corresponding parameter measures quantities such as the low pass filter's 64 rise time, overshoot, natural frequency, or damping factor; or the high pass filter's 66 rise time, overshoot, natural frequency, or damping factor. The most effective weight vector is one that generates a parameter that is useful for cellular phone fraud detection. The second weight vector is orthogonal to the first and is selected to maximize the probability of detecting a fraudulent phone, given a fixed probability of blocking a good customer. It should be apparent that this weight vector formulation permits the measurement of any parameter associated with the modulation of the signal. The concepts presented here are easily expanded to more than just two projections or linear combinations of such projections.

Figure 4:
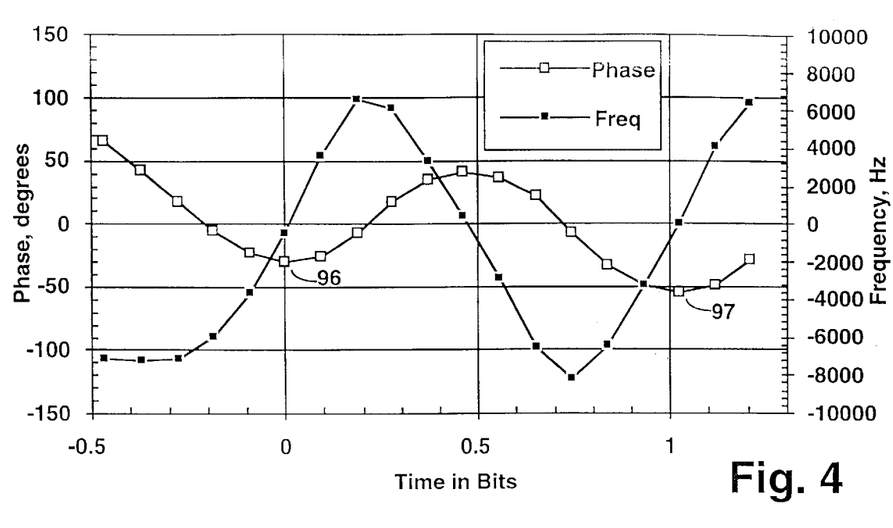
FIG. 4 is the phase and frequency of 1.7 bits of the manchester encoded FSK RECC signal.

The signal processing diagrammed in FIG. 3 has mainly been concerned with N samples per bit (vectors of length N). By expanding 93 the vector length for bit index 011 to include most of the next bit, a weight vector 95 can be selected to point in the direction of the modulator's high pass filter's natural frequency, to form parameter 2. Since the high pass filter's rise time typically spans several bits, an extended length vector is needed. The smoothed phase vector for bit index 011 from a typical cellular phone is shown in FIG. 4. The previous bit is not shown, the current bit is shown between −0.5 and +0.5 bits, and some of the next bit is shown from 0.5 to 1.2 bits. The derivative of the instantaneous phase of the signal is the instantaneous frequency which is also shown in FIG. 4. Note that the phase 96 at bit time 0.0 is different than 97 at bit time 1.02. This difference is principally due to the high pass filter characteristics of the cellular phone's modulator. The weight vector 95 of FIG. 3 is used to measure this difference which is parameter 2.

4. Post FSK-Carrier Parameters

Parameters 7, 8, and 9 measure the characteristics of the fm waveform immediately following the last bit of the FSK modulation of the RECC signal. The measurement is taken between markers 42 and 44 of FIG. 6. This measurement attempts to characterize the high pass filter's 66 characteristics which may be different than the characterization 94 of parameter 2. These parameters measure the turn-off effects of the modulator.

The modulator in a typical cellular phone (shown in FIG. 2) is capable of synthesizing 3 frequencies: low, center, and high. Normally, the low frequency is 8 kHz lower than the RECC center frequency and the high frequency is 8 kHz greater than the RECC center frequency. Pre-carrier and post-carrier (unmodulated carrier present before and after the FSK modulation) are usually at the center frequency. A binary 1 is represented by a 50 $\mu$s transmission at the low frequency followed by a 50 $\mu$s burst at the high frequency. A binary 0 is represented by a 50 $\mu$s us transmission at the high frequency followed by a 50 $\mu$s is burst at the low frequency. A single bit is 2×50 $\mu$s=100 $\mu$s(1/10 kHz). After filtering (in filters 64 and 66) and amplification (by amplifier 65), the high or low voltages cause the oscillator 68 to shift in frequency ±8 kHz. The oscillator 68 FSK modulates an RF local oscillator signal from synthesizer 67 tuned to one of the control channel frequencies (the RECC center frequency) determined by the channel number input. It appears that the digital data source 62 in a cellular phone is a.c. coupled 66 to the modulator 68. This presents no problems in the cellular phone since the manchester encoding 63 always is balanced. A binary "1" has an average frequency offset of zero (50 $\mu$s×−8 kHz+50 $\mu$s×+8 kHz=0). When the cellular phone stops the digital modulation and starts the post-carrier, the signal going into the modulator 68 persists in one of 3 states: center, high, or low. This input signal for a given make of a cellular phone is zero, or either positive or negative respectively. When the input signal is switched to and remains at a positive or negative level, the high pass filter 66 to the modulator receives a step input and therefore outputs a step response. The step response of filter 66 is a unique parameter that is used to characterize each particular cellular phone. Note that this non-FSK modulation step response is not associated with the transmitter's RF turn-on or turn-off transient described by Ferrell, but is associated with the step response of the modulator within the transmitter. The circuit components and processes used to manufacture the high pass filter 66, low pass filter 64, and other elements of FIG. 2 vary from one cellular phone to another even for the same manufacturer giving rise to unique parameters for each user phone.

Figure 6:
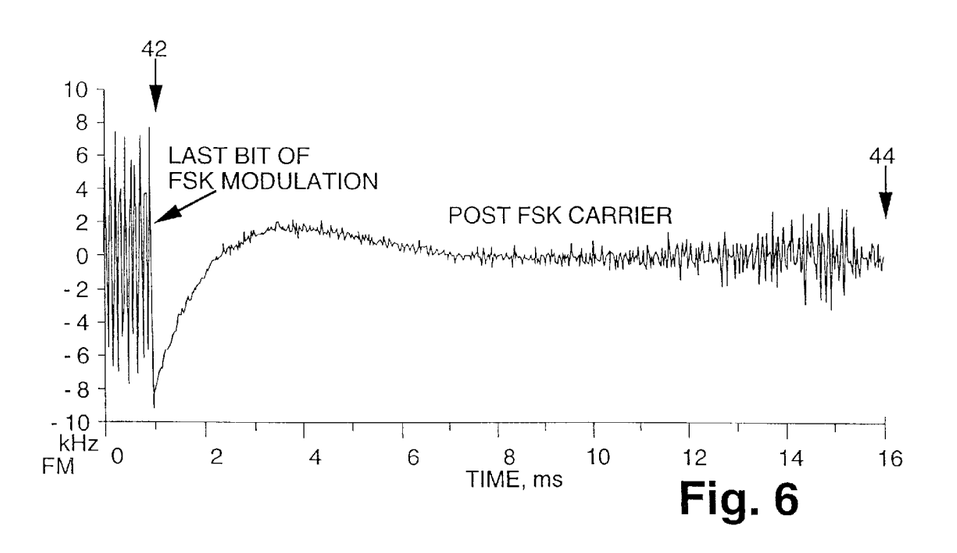
FIG. 6 is a plot of the output of a frequency demodulator showing the characteristics of the signal immediately after the end of modulation.
Figure 7:
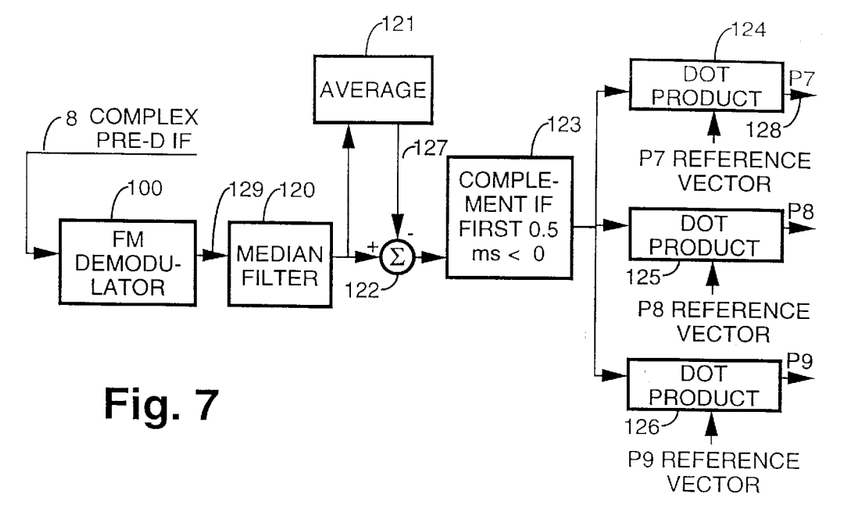
FIG. 7 is a signal processing diagram for characterizing the fm waveform during post-carrier.

FIG. 7 shows the signal processing performed by a digital signal processor. An FM demodulator (frequency discriminator) 100 implemented in software produces an fm waveform. The fm waveform 129 at the output of the fm demodulator 100 should be identical to the input 69 of the voltage controlled oscillator 68 (excluding RF propagation effects). This waveform is plotted in FIG. 6 for a typical cellular phone. In this example, the last bit of the RECC transmission was a "0" and thus the last input voltage into the modulator was negative. The end of the FSK modulation occurs at time marker 42. The next 35 ms up to time marker 43 is postcarrier. The signal processing of FIG. 7 only uses the first 15 ms of the post-carrier, between time markers 42 and 44. It does not use the RF transmitter turn-off of the signal at time marker 43. Other durations of post-carrier processing are readily apparent.

It has been determined that the signal center frequency of cellular phones is not very stable and so special steps are taken to ensure that the measurements are not taken with respect to any pre-determined frequency. This is accomplished by calculating, in average unit 121, the signal center frequency offset 127 and subtracting 122 it from the filtered fm. The median filter 120 removes any fin "pops or clicks" due to low SNR. Decimation after the median filter is appropriate since the bandwidth of the filtered fm waveform is substantially less during postcarrier when compared to the FSK modulation.

Figure 5:
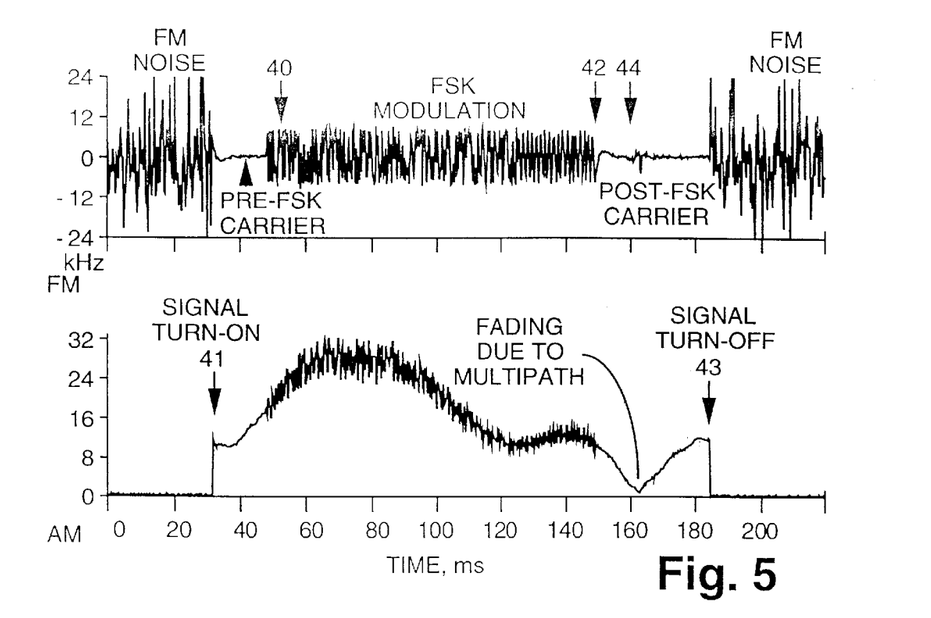
FIG. 5 is a plot of the outputs of a frequency discriminator and an amplitude detector operating on a RECC signal showing key time markers.

A test is performed to determine if the last bit of the RECC transmission was a "0" or a "1". If it was a "0" (the persistent input signal to the modulator 68 is negative), then the waveform is negated 123. This makes the resultant parameters insensitive to the data content of the RECC message. FIG. 6 is an example of a cellular phone with a negative input signal into the modulator; an expansion of FIG. 5 between time markers 42 and 44. Other examples of zero or negative inputs could have been presented.

In this invention, a parameter is insensitive to a phenomenon provided that the standard deviation of that parameter when the phenomenon is present or at one end of its range, is no more than 25% greater than when the phenomenon is absent or at the other end of its range, and the mean of the parameter changes by no more than 0.25 standard deviations from when the phenomenon is present to when it is absent. In addition to the bit sequence of the RECC signal, this signal processing is also insensitive to signal to noise ratio, signal amplitude, signal center frequency offset, time of intercept, multipath RF propagation, co-channel interference, and signal fading.

The last processing step of FIG. 7, is to measure of the degree of similarity 124, 125, 126 between the post-carrier fm waveform and 1 or more reference vectors. The reference vectors have been selected to maximize the ability of this processing to distinguish between a representative set of cellular phones.

Figure 8:
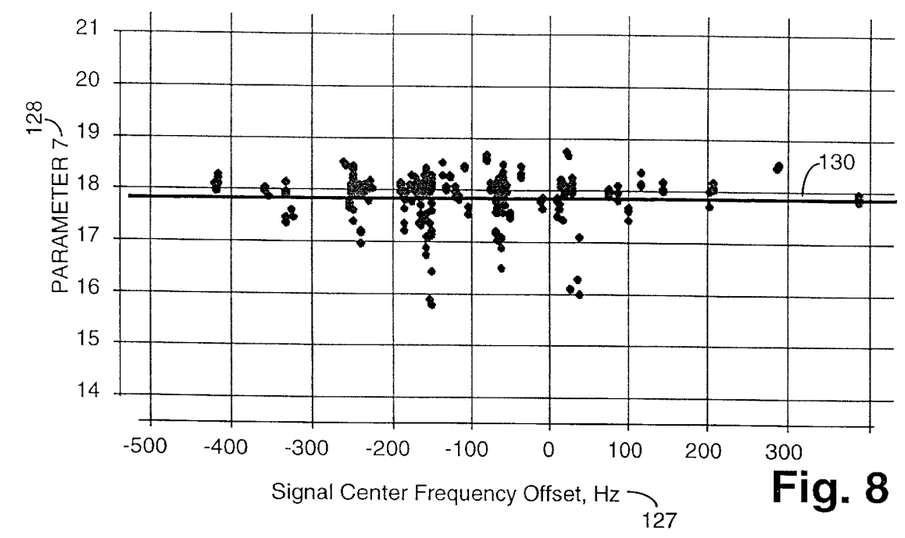
FIG. 8 is a scatter plot showing the relationship between parameter 7 and the signal center frequency offset for several hundred intercepts from the same cellular phone.

FIG. 8 is a scatter plot of parameter 7 (128) verses the signal center frequency offset 127 for several hundred intercepts of a typical cellular phone. It shows that parameter 7 is uncorrelated with the signal center frequency offset demonstrated by a near zero slope of regression line 130. The meaning of FIG. 8 is that the processing of FIG. 7 in fact operates independent of any predetermined frequency and thus confirms that the actual operation is consistent with the design intent.

5. Repeated Trials

The concept of distance in this invention disclosure is related to likelihood, probability, confidence level, or score. Thus, a computation of one of these terms is equivalent to the computation of the others. Parameters 7 are used in the computation of a distance measure 13, between the parameter statistics of a good subscriber's phone, and the observed parameter vector.

Parameter statistics include, but are not limited to, the following statistical measures that characterize the distribution of a parameter: mean, median, average of two order statistics, order statistics, median average deviation, standard deviation, variance, interquartile, or difference between two order statistics.

If the distance between a received signal and its claimed MIN and/or ESN parameter statistics is greater than a prescribed threshold, then the decision is made that the intercept is fraudulent. This distance measure has a statistical distribution so that a large percentage of the intercepts from a fraudulent phone will produce decisions that the phone is fraudulent (probability of fraud detection) and so that a small percentage of the intercepts from a good phone will produce decisions that the phone is fraudulent (probability of blocking). The problem with this decision rule is that after many repeated attempts, a fraudulent phone can eventually gain access to the network.

To overcome this problem, the current distance and the distances from several previous intercepts are used to determine whether or not the cellular phone is fraudulent. This is accomplished as follows. If the distance is less than the medium-threshold, then a 0 is appended to a memory associated with the claimed identification code, otherwise a 1 is appended to the memory. If the memory length grows longer than a given size, then the oldest decision is discarded, so that the memory only spans a given number of previous intercepts. For each possible memory size, N, if there are M or more 1's, then the decision is made that the phone is fraudulent; the state is set to fraudulent. Otherwise, the state is good. If the distance is less than the small-threshold and the state is fraudulent, then the memory length is set to 1 with a 0 inserted into the memory and the state is changed to good. This permits the logic to quickly adapt to a good phone entering a cell where a fraudulent phone was previously operating. If the distance is greater than the large-threshold and the state is good, then the memory length is set to 1 with a 1 inserted into the memory and the state is changed to fraudulent. This permits the logic to quickly adapt to a fraudulent phone entering a cell where a good phone was previously operating.

6. Applications

There are a variety of commercially valuable applications of the inventive technology disclosed herein. For example, this invention can be used to determine whether or not a cellular phone call originates from a legitimate subscriber or from a fraudulent phone that is cloned to emulate the legitimate subscriber. Based on this information, a fraudulent call can be terminated, the bill to the authorized subscriber for that call can be forgiven, or calling patterns of both authorized and fraudulent subscribers can be established.

This invention may also be deployed to collect evidence of the criminal activities of the fraudulent subscribers. It may be used to focus law enforcement activities to apprehend fraudulent subscribers.

7. Further And Other Embodiments

It should be realized that the precise components making up an implementation of the system of FIGS. 1, 9 and 10 are not critical to its operation. It is only necessary that the components selected for the particular implementation provide the function of the system, which have been described above. In particular, any of a variety of digital signal processors and other combinations of hardware and computer programs incorporating the signal processing algorithms could be used to accomplish the desired results. It is thought that the present invention and its advantages will be understood from the foregoing description and it will be apparent that various changes may be made thereto without departing from the spirit and scope of the invention or sacrificing all of its material advantages, the form herein before described being merely a preferred embodiment thereof.

While the invention has been particularly shown and described with reference to preferred embodiments thereof it will be understood by those skilled in the art that various changes in form and details may be made therein without departing from the spirit and scope of the invention.

We claim:

1. A transmitter identification system including a plurality of transmitters, each transmitter broadcasting a transmitter signal having an identification code where the plurality of transmitters in include a plurality of authorized transmitters and one or more unauthorized transmitters where at times,     each authorized transmitter has an authorized identification code and transmits an authorized-transmitter signal having authorized-transmitter modulation characteristics and containing said authorized identification code,     each unauthorized transmitter transmits an unauthorized-transmitter signal having unauthorized-transmitter modulation characteristics and containing an unauthorized identification code identical to an authorized identification code of an authorized transmitter, said transmitter identification system comprising:

receiving means including two or more antennas, each antenna receiving a particular transmitter signal and providing a corresponding antenna output signal and including two or more RF downconverters, each RF downconverter processing a different antenna output signal to provide a downconverted signal, whereby two or more single downconverted signals are formed, combining means for combining said two or more single downconverted signals to form a combined signal representing said particular transmitter signal, said combined signal having a signal-to-noise power ratio greater than a signal-to-noise power ratio of any single downconverted signal, demodulating means for demodulating said combined signal to recover a particular identification code contained within said particular transmitter signal, extraction means for extracting parameters representng said modulation characteristics from said combined signal, and determining means for determining the likelihood, based on said parameters, that said particular transmitter signal is not from an authorized transmitter having an authorized identificaton code the same as said particular identification code.

2. A transmitter identification system including a plurality of transmitters, each transmitter broadcasting a transmitter signal having an identification code unique to said transmitter comprising:

receiving means including two or more antennas, each antenna for receiving said broadcast transmitter signal and providing a corresponding antenna output signal and including two or more RF downconverters, each RF downconverter processing a different antenna output signal to provide a downconverted signal, whereby two or more downconverted signals are formed, each RF downconverter including a digital filter with coefficients that cause the impulse response of said downconverter and included digital filter to be substantially the same as the impulse response of other downconverters and included digital filters, combining means for combining said two or more downconverted signals to form a combined signal representing said transmitter signal, demodulating means for demodulating said combined signal to recover the identification code corresponding to the said transmitter, extraction means for extracting parameters from said combined signal, and means for determining the likelihood that said parameters are typical for said transmitter having the identification code recovered for said transmitter.

3. A transmitter identification system including a plurality of transmitters, each transmitter broadcasting a transmitter signal having an identification code where the plurality of transmitters include a plurality of authorized transmitters and one or more unauthorized transmitters where at times, each authorized transmitter has an authorized identification code and transmits an authorized-transmitter signal having authorized-transmitter modulation characteristics and containing said authorized identification code, each unauthorized transmitter transmits an unauthorized-transmitter signal having unauthorized-transmitter modulation characteristics and containing an unauthorized identification code identical to an authorized identification code of an authorized transmitter, said transmitter identification system comprising:

receiving means for receiving a particular transmitter signal and providing a corresponding received signal, demodulating means for demodulating said received signal to recover a particular identification code contained within said particular transmitter signal, extraction means for extracting parameters from said received signal, said extraction means including means for measuring one or more modulation characteristics to form said parameters, and determining means for determining the likelihood, based on said parameters, that said particular transmitter signal is not from an authorized transmitter having an authorized identification cod the same as said particular identification code.

4. A transmitter identification system including a plurality of transmitters, each transmitter broadcasting a transmitter signal having an identification code where the plurality of transmitters include a plurality of authorized transmitters and one or more unauthorized transmitters where at times, each authorized transmitter has an authorized identification code and transmits an authorized-transmitter signal having authorized-transmitter signal characteristics and containing said authorized identification code, each unauthorized transmitter transmits an unauthorized-transmitter signal having unauthorized-transmitter signal characteristics and containing an unauthorized identification code identical to an authorized identification code of an authorized transmitter, said transmitter identification system comprising:

receiving means for receiving a particular transmitter signal and providing a corresponding received signal, demodulating means for demodulating said received signal to recover a particular identification code contained within said particular transmitter signal, extraction means for extracting parameters from said received signal, said extraction means including processing means for processing a plurality of signal characteristics to form said parameters, and determining means for determining the likelihood based on said parameters, that said particular transmitter signal is not from an authorized transmitter having an authorized identification code the same as said particular identification code.

5. A transmitter identification system of claim 4 wherein said processing means includes means for frequency demodulating said received signal to form a frequency waveform, means for selecting portions of said frequency waveform, and means for measuring the similarity between one or more of said portions and one or more reference signals.

6. A transmitter identification system of claim 4 wherein said processing means includes:

means for phase demodulating said received signal to form a phase waveform which is related to the instantaneous phase of the received signal, comparison means for comparing a portion of the phase waveform with a reference waveform, said comparison being insensitve to the time average of the difference between the phase waveform and the reference waveform, means for calculating one of said parameters based upon the output of said comparison means.

7. A transmitter identification system of claim 5 wherein a transmitter that transmits said particular transmitter signal has a modulator having a transient that starts when an information signal to said modulator ceases and said processing means includes means for measuring said transient.

8. A transmitter identification system of claim 4 wherein said authorized-transmitter and said unauthorized-transmitter signals are formed of bits of information that are encoded by modulating a radio-frequency carrier, wherein said identification code is represented by some of said bits and wherein said demodulating means recovers said bits and said processing means includes means for extraction of one or more parameters that are linear combinations of said bits.

9. A transmitter identification system of claim 4 wherein said demodulation means recovers bits that occur in bit sequences encoded in said received signal and said processing means includes means for synchronous integration of portions of the received signal which have the same bit sequence, thereby forming a synchronous signal.

10. A transmitter identification system of claim 4 wherein said processing means includes means to make said parameter extraction insensitive to any one or more of the following characteristics of the particular transmitter signal received by said receiving means, signal-to-noise ratio, signal amplitude, signal center frequency offset, data content of the modulation, time of intercept, multipath RF propagation, co-channel interference, or signal fading.

11. A transitter idenification system of claim 4 wherein said determining means includes:

means for computing a current distance between said parameters and stored parameter statistics for an authorized transmitter having an identification code the same as said particular identification code, means for retrieving a previous probability that a transmitter previously using said particular identification code was not an authorized transmitter, and means for calculating the likelihood, based on the current distance and the previous probability, that said particular transmitter signal is not from an authorized transmitter.

12. A transmitter identification system of claim 4 including means for detecting when said particular transmitter signal is present or absent.

13. A transmitter validation system of claim 9 wherein said processing means also includes:

means for phase demodulating said synchronous signal to form a phase waveform, and means for calculating one of said parameters based upon a comparison of the phase waveform with a reference waveform, said comparison being insensitive to the time average of the difference between the phase waveform and the reference waveform.

14. A transmitter identification system of claim 4 wherein said receiving means includes two or more RF downconverters and two or more digital filters with coefficients that cause the combined impulse response of a first digital filter and a first downconverter to be substantially the same as the combined impulse response of a second digital filter and a second downconverter.

15. A transmitter identification system of claim 4 wherein said receiving means includes two or more RF downconverters where an impulse response of a first one of said downconverters is substantially the same as an impulse response of a second one of said downconverters.

* * * * *